United States Patent Office 2,947,056
Patented Aug. 2, 1960

---

2,947,056

SINTERED ALUMINA ARTICLES AND A PROCESS FOR THE PRODUCTION THEREOF

István Csordás and Béla Lányi, Budapest, Zoltán Veress, Karcag-Berekfurdo, and László Vissy, Budapest, Hungary, assignors to Kabel-es Muanyaggyar, Budapest, Hungary No Drawing. Filed Oct. 8, 1957, Ser. No. 688,827

2 Claims. (Cl. 25—157)

This invention relates to sintered alumina articles in particular shaped pieces, such for example as wiredrawing dies, grinding or metal cutting tools, and to a process for the production thereof.

Corundum articles can be produced from alumina powder by sintering at high temperatures. Thus for example substantially pore-free shaped pieces having uniform structure may be produced from pure alumina powder, the melting point of which is 2050° C., by sintering in an oxidising atmosphere at about 1800° C. The production of such high temperatures in industrial furnaces having the necessary oxidising atmosphere, however, requires expensive air-heating which dissipates a great deal of heat energy. Certain additions to the alumina tending to reduce the sintering temperature and produce a finer grain structure have been proposed but these additions generally reduce the hardness and uniformity of the sintered piece.

We have now found that sintered alumina articles in which 90% of the constituent particles of the sintered texture have a maximum grain size less than 10 microns and which consist of at least 99.9% of aluminium oxide are especially suitable for industrial purposes such as wire drawing, grinding or metal cutting and may be prepared by sintering a suitable alumina powder, for example in a normal magnesite furnace at a temperature substantially lower than that hitherto used. Such articles in general possess very fine grain structure, high temperature resistance and great strength.

According to the present invention, therefore, we provide sintered alumina articles comprising a matrix of sintered alumina of at least 99.9% aluminium oxide. 90% of the particles of the sintered texture are less than 10 microns in diameter into which is embedded, if desired, up to 66 percent by weight of another hard, refractory, pulverulent material or materials.

The alumina should preferably be alpha-alumina. The total content of metal oxide impurities in particular titanium, manganese or sodium oxides in the alumina should be as low as possible, preferably below 0.02% of the total weight and the silica content should preferably be below 0.1%. Articles containing 99.99% $Al_2O_3$ possess especially suitable properties.

Although for many purposes it is preferable to use articles consisting entirely of fine alumina, of at least 99.9% aluminium oxide contents 90% of the grains of the sintered texture are less than 10 microns it is often advantageous to include in the articles other hard refractory particles. Thus between 50 and 200% (calculated on the weight of alumina) of electrically produced corundum of large grain size, for example 1–2 mm., may be present. Articles containing up to 200% of silicon carbide are also found to have favourable properties, e.g. of an average grain size of 1 micron.

According to the invention we also provide a process for producing the sintered alumina articles in which alumina powder, the particles of which have a maximum diameter of 10 microns, is sintered below 1700° C. The time of heating should be so restricted that, in fact, the diameter of 90 percent of the resulting sintered particles remains below 10 microns. The alumina used for sintering should preferably contain at least 99.9% $Al_2O_3$ and we particularly prefer the content to be 99.99% $Al_2O_3$.

The alumina powder should preferably consist substantially of alpha-alumina and should not contain more then 0.02% of titanium, manganese or sodium oxides or more than 0.1% of silica. Particularly satisfactory articles are obtained if the maximum diameter of the alumina particles before sintering is below 3 microns and if 50% or even better 90% of the particles are below 1 micron in size.

It is preferred that when 50% of the particles are less than 1 micron in diameter the sintering temperature should not exceed 1500° C. although the maximum temperature depends to some extent on the size and size-distribution of the grains. Thus when a powder in which 90% of the alumina grains are below 1 micron in diameter is used the sintering temperature should lie between 1450 and 1500° C., preferably at about 1480° C.; in this case the sintering time should not exceed 1 hour and should preferably be between 10 and 15 minutes.

To produce the fine alumina powder coarser alumina can be ground in ball mills, advantageously vibration mills. In order to avoid the introduction of impurities it is advantageous to use grinding elements of pure corundum. The inner walls of the mills are preferably coated with an organic substance which burns without leaving ash at the high sintering temperatures to which the alumina is later submitted.

A convenient source of fine-ground alumina is commercial pure hydrated alumina, if necessary further purified.

One can also use fine dust occurring in the pulverization of corundum blocks in connection with electrically produced corundum production, which have been previously purified.

In the production of the articles according to the invention one can conveniently use the known process of preparing a paste of the alumina powder with water, or an aqueous solution of a water-miscible organic solvent, for example, alcohol or glycol, and forming the articles therefrom, for example by casting in a plaster mould. The articles may also be produced by moulding or extrusion using pastes of a suitable consistency. After a period of drying the articles are advantageously submitted to a consolidating heat treatment below the sintering temperature and machined to the desired shape and size before sintering. In this way sintered articles having accurate dimensions can be produced; after sintering the article can also be machined, e.g. by lapping.

In general the solidifying heat treatment may be carried out within a temperature range of 400–500° C. However in certain cases it is advantageous to carry out the consolidating heat treatment at higher temperatures, preferably at 1000–1400° C. In many cases the higher the applied consolidation temperature, the more solid are the resultant articles which can therefore be shaped more accurately prior to sintering to lead finally to more accurately shaped sintered articles.

The amount of liquid used in preparing the paste prior to casting or other treatment can be reduced by employing additional organic wetting agents. Paste suitable for casting may be produced in this way, which, calculated on the quantity of alumina powder contains less than 30% water or aqueous organic liquid. Fatty acid derivatives can be used to advantage as wetting agents and the use of sperm oil has proved very suitable. The paste produced in the above manner is advantageously freed from air bubbles before casting by vacuum treatment.

The consistency of the paste can be increased by including ammonium hydroxide in the added liquid composition and adding subsequently an organic acid, for example, formic acid. If one neutralizes or makes weakly alkaline a paste solidified in this way with ammonia, the mass becomes more fluid and can be more easily used again for the casting of the article.

In order that the invention may be well understood the following examples are given by way of illustration only.

Example 1

An alpha-alumina powder, having the following composition is used:

|  | Percent |
|---|---|
| $Al_2O_3$ | 99.995 |
| $TiO_2$ | 0.001 |
| $SiO_2$ | 0.002 |
| $Na_2O$ | 0.001 |
| $V_2O_5$ | 0.0005 | and manganese in traces. 90% of the alpha-alumina particles are less than 1 micron in grain size and 10% lie between 1 and 3 microns. For preparation of the moulding paste 25 kg. of liquid of the following composition are intimately mixed with 100 kg. of the alumina powder:

0.8 kg. sperm oil, dissolved in 3.2 kg. of ethyl alcohol
6.4 kg. of concentrated ammonium hydroxide
3.7 kg. of ethyl alcohol
10.6 kg. of water One obtains in this way a fluid paste, from which one removes the air bubbles under vacuum. Blade shaped pieces are then cast in a plaster mould of dimensions 18 x 16 x 6 mm. The shaped pieces cast in this manner are removed from the plaster mould, dried in the atmosphere and thereafter at 110° C. The consolidating heat treatment is carried out in such a way that the shaped pieces are heated over a period of two hours to 1100° C. and kept at this temperature for 10 minutes. Thereafter they are slowly cooled, ground to the desired size, taking into account the change of size which follows during subsequent sintering, and finally sintered. The sintering is carried out by heating the pieces over a period of 3 hours to 1480° C. in a gas-heated furnace in an oxidizing atmosphere, keeping them for 5 minutes at this temperature and then slowly cooling them. The cooled blade shaped pieces after sintering may then be precision tooled and lapped. The cutting edge of the shaped piece used for cutting steel is ground with a diamond grinding wheel. A cutting tool prepared in this manner could cut without sharpening 3.6 tons of steel having a breaking strength of 80 kg./mm.² the cutting having been performed at a constant feed depth of cut and rotational speed, where the obtained chips were of dark blue appearance.

Drawing dies are cast in a similar way having an outer diameter of 24 mm. and an inner diameter of 6 mm. These drawing dies show after sintering and subsequent machining of the outer and of the inner surfaces a shrinkage of about 14–17%. 30 tons of copper wire were drawn through this drawing die with a reduction of 33%, without any wear being noticeable on the drawing die. With a drawing die of smaller dimensions copper wire of diameter 2.5 millimeters was drawn to 2.0 mm. at a speed of 350 meters/minute. After drawing 15 tons of copper wire no alteration of size in the drawing die could be found.

Example 2

Paste produced as in Example 1 and freed of air bubbles in vacuo is neutralized with concentrated formic acid and weakly acidified to pH 4. The consistency of the fluid paste is increased in this way, to such an extent that it can readily be used for pressing. One can also produce in this way castings of uniformly dense structure. This plastic mass can for example be moulded in a plaster mould and in this manner refractory objects for example crucibles for laboratory purposes, can be produced, the dimensions of which may be as much as diameter 20–70 mm., height 25–90 mm. and wall thickness 1–3 mm. After the moulding the castings are left in the plaster mould for 15 minutes, removed, dried first in the atmosphere and then at 110° C. and finally consolidated at 1100° C. The surfaces of the cooled-off castings may then be planed and sintered at 1480° C. for 10 minutes.

Tubes of 1 mm. outer and 0.5 mm. inner diameter may be drawn and then dried and consolidated in the same way as the above crucibles. Tubes sintered in this manner have a density of 3.88–3.97 g./ml., possess accurate dimensions, are free from gas and owing to their high purity may be used in radio valves, as, inter alia, they do not materially affect tungsten at high temperatures.

Example 3

Paste left over from the moulding in Example 2 is made weakly alkaline with gaseous ammonia or concentrated ammonium hydroxide, whereupon the paste becomes relatively fluid and may then be used, for example, for casting or moulding after acidification with formic acid.

Example 4

100 kg. of alpha-alumina powder with an average grain-size of 1 micron is worked up into a fluid casting paste with 10–14 kg. of water, 7 kg. of concentrated ammonium hydroxide and 2 kg. of sperm oil dissolved in 6 kg. of alcohol. This paste may be worked up into shaped pieces as in Example 1 or 2. The quantity of wetting agent used should in general be greater, the finer is the alumina powder. If the average grain-size of the corundum powder used is 0.1 micron, then three or four times the above quantity of wetting agent should be used. If one produces castings from this fine-grained paste and consolidates at 1000° C., machines the resulting piece, sinters at 1480° C. and then laps, one can obtain a surface smoothness of a fineness of $h_q = 0.02$–$0.03$.

According to the invention the shaped pieces are not necessarily homogeneous, but may also contain larger particles embedded in the sintered fine alumina. Electrically produced corundum particles of widely varying size, or silicon carbide, or other refractory carbides may be so embedded and for example electro-corundum crystals of an average size of 1–2 mm. can be embedded in a slip produced according to Example 1. These electrically produced corundum grains may form between 50 and 200% of the fine alumina. Shaped pieces may be produced in this way weighing up to 10–12 kg. which may then be sintered in a magnesite furnace, such as is generally used in industry, with a shrinkage of 4–5%. Casting crucibles, crucible plugs and crucible linings produced in this manner are useful in electro-steel metallurgy.

In the same way silicon carbide crystals may be incorporated into the fine alumina paste. At the low sintering temperatures used the composition forms an extremely compact mass and shaped pieces produced from such pastes possess considerable hardness. Furthermore the heat conductivity of such shaped pieces is considerably increased by the incorporation of silicon carbide crystals. Turbine blades may also be produced by sintering mixtures of this kind. Similarly other refractory hard carbides may be incorporated and produce excellent grinding and polishing stones.

Example 5

Two parts of silicon carbide of 1 micron average grain-size are added to one part of fine alumina in the form of a paste according to Example 1. Rods are produced of 5–10 mm. diameter by moulding as in Example 1. The rods are then dried, subjected to a consolidating heat treatment at 1100° C. and if desired, machined, for example, by boring holes of 2 mm. depth and 1 mm. diameter, and finally sintered at 1480° C. These rods can be used as electric resistance elements. Also grinding stones may be prepared from such a paste.

What we claim is:

1. Process for the manufacture of sintered alumina body adapted to be used for cutting and drawing tools, comprising molding α-alumina powder, having at least 99.99% $Al_2O_3$ content, the α-alumina particles being less than 3 microns in diameter and at least 90% of same being less than 1 micron, into a shaped body, then sintering at a temperature between 1450° and 1500° C., and keeping said body at the maximum sintering temperature for such a short time that at least 90% of the grain size of the sintered body should not exceed 10 microns.

2. Process according to claim 1 in which the sintering is carried out at the maximum sintering temperature for a shorter time than 15 minutes.

References Cited in the file of this patent

UNITED STATES PATENTS

| | | |
|---|---|---|
| 1,107,012 | Allen | Aug. 11, 1914 |
| 2,030,200 | Gallup | Feb. 11, 1936 |
| 2,108,513 | Shardlow | Feb. 15, 1938 |
| 2,270,607 | Ryschkewitsch | Jan. 20, 1942 |
| 2,314,758 | Berns | Mar. 23, 1943 |
| 2,388,080 | Riddle | Oct. 30, 1945 |
| 2,457,515 | Acker | Dec. 28, 1948 |
| 2,531,397 | Caton | Nov. 28, 1950 |
| 2,618,567 | Comstock | Nov. 18, 1952 |
| 2,698,990 | Conant et al. | Jan. 11, 1955 |
| 2,810,182 | Brandes | Oct. 22, 1957 |

FOREIGN PATENTS

| | | |
|---|---|---|
| 146,790 | Australia | Feb. 18, 1949 |

OTHER REFERENCES

Klingler, 387,359, ab. May 11, 1943.